US012344445B2

(12) United States Patent
Ackroyd

(10) Patent No.: US 12,344,445 B2
(45) Date of Patent: Jul. 1, 2025

(54) ADJUSTABLE TRAY

(71) Applicant: Graphic Packaging International, LLC, Atlanta, GA (US)

(72) Inventor: Robert Ackroyd, Leeds (GB)

(73) Assignee: Graphic Packaging International, LLC, Atlanta, GA (US)

( * ) Notice: Subject to any disclaimer, the term of this patent is extended or adjusted under 35 U.S.C. 154(b) by 854 days.

(21) Appl. No.: 16/685,200

(22) Filed: Nov. 15, 2019

(65) Prior Publication Data

US 2020/0156819 A1 May 21, 2020

Related U.S. Application Data

(60) Provisional application No. 62/770,012, filed on Nov. 20, 2018.

(51) Int. Cl.

| | |
|---|---|
| ***B65D 5/24*** | (2006.01) |
| ***B31B 50/26*** | (2017.01) |
| ***B31B 100/00*** | (2017.01) |
| ***B31B 120/30*** | (2017.01) |
| ***B65D 5/20*** | (2006.01) |
| ***B65D 81/34*** | (2006.01) |
| *B31B 110/35* | (2017.01) |

(52) U.S. Cl.

CPC .............. *B65D 5/247* (2013.01); *B31B 50/26* (2017.08); *B65D 5/2023* (2013.01); *B65D 81/3453* (2013.01); *B31B 2100/0024* (2017.08); *B31B 2110/35* (2017.08); *B31B 2120/302* (2017.08); *B65D 2581/3413* (2013.01); *B65D 2581/3439* (2013.01)

(58) Field of Classification Search

CPC .......... B65D 5/30; B65D 5/02; B65D 5/2023; B65D 2581/3439; B31B 2100/00; B31B 2100/0024; B31B 2110/35

USPC ........... 206/557, 140, 141, 154; 229/40, 903

See application file for complete search history.

(56) References Cited

U.S. PATENT DOCUMENTS

| | | | |
|---|---|---|---|
| 622,921 | A | 4/1899 | Fuller |
| 667,634 | A | 2/1901 | Schmidt |

(Continued)

FOREIGN PATENT DOCUMENTS

| | | |
|---|---|---|
| DE | 299 07 411 U1 | 8/1999 |
| EP | 0270838 | 6/1988 |

(Continued)

OTHER PUBLICATIONS

Supplementary European Search Report for EP 19 88 6677 dated Jul. 19, 2022.

(Continued)

*Primary Examiner* — Anthony D Stashick
*Assistant Examiner* — Raven Collins
(74) *Attorney, Agent, or Firm* — FisherBroyles, LLP

(57) ABSTRACT

A tray for supporting a food product includes a plurality of panels extending at least partially around an interior of the tray, the plurality of panels including a central panel, at least one side panel, and at least one end panel. At least one corner flap is foldably connected to the at least one end panel, and at least one adjustment feature receives at least a portion of the at least one corner flap such that the tray is reconfigurable between an erected configuration and a collapsed configuration.

32 Claims, 7 Drawing Sheets

(56) References Cited

U.S. PATENT DOCUMENTS

| | | | | | |
|---|---|---|---|---|---|
| 2,016,754 | A | | 10/1935 | Perkit | |
| 2,037,502 | A | | 4/1936 | Cox | |
| 2,043,104 | A | | 6/1936 | Clancy | |
| 2,147,676 | A | * | 2/1939 | Shoemaker ............ | B65D 5/304 229/196 |
| 2,232,088 | A | | 2/1941 | Waters | |
| 2,321,848 | A | | 6/1943 | O'Reilly | |
| 2,443,256 | A | * | 6/1948 | Lebold ............... | B65D 5/48018 229/117.26 |
| 2,740,576 | A | | 4/1956 | Franck | |
| 2,800,893 | A | | 7/1957 | Norman et al. | |
| 2,836,339 | A | | 5/1958 | Pringle | |
| 2,858,630 | A | | 11/1958 | Gorman | |
| 3,276,660 | A | | 10/1966 | Vesak | |
| 3,300,117 | A | | 1/1967 | Kossnar | |
| 3,366,306 | A | | 1/1968 | Kotowick | |
| 3,425,543 | A | | 2/1969 | Harvey | |
| 3,447,672 | A | | 6/1969 | Bailey et al. | |
| 3,478,950 | A | | 11/1969 | Stevens | |
| 3,515,331 | A | | 6/1970 | Guthrie, Sr. | |
| 3,516,595 | A | | 6/1970 | Bailey | |
| 3,630,430 | A | | 12/1971 | Struble | |
| 3,637,130 | A | | 1/1972 | Farquhar | |
| 3,767,108 | A | | 10/1973 | Arneson | |
| 3,833,113 | A | | 9/1974 | Osier | |
| 3,845,897 | A | | 11/1974 | Buttery et al. | |
| 3,876,131 | A | | 4/1975 | Tolaas | |
| 3,877,632 | A | | 4/1975 | Steel | |
| 3,912,331 | A | | 10/1975 | Turner et al. | |
| 3,927,823 | A | | 12/1975 | Persson | |
| 4,049,188 | A | | 9/1977 | Persson | |
| 4,079,853 | A | | 3/1978 | Casutt | |
| 4,109,848 | A | | 8/1978 | Kipp et al. | |
| 4,124,160 | A | | 11/1978 | Meyers et al. | |
| 4,126,265 | A | | 11/1978 | Holmes | |
| 4,185,764 | A | | 1/1980 | Cote | |
| 4,205,775 | A | | 6/1980 | Swan | |
| 4,227,640 | A | | 10/1980 | Roccaforte | |
| 4,244,472 | A | | 1/1981 | Brown | |
| 4,267,955 | A | | 5/1981 | Struble | |
| 4,277,506 | A | | 7/1981 | Austin | |
| 4,410,129 | A | | 10/1983 | Wischusen, III | |
| 4,432,489 | A | | 2/1984 | Cote | |
| 4,502,623 | A | | 3/1985 | Moore et al. | |
| 4,775,771 | A | | 10/1988 | Pawlowski et al. | |
| 4,792,084 | A | | 12/1988 | Dreeszen | |
| 4,801,774 | A | | 1/1989 | Hart | |
| 4,836,439 | A | | 6/1989 | Hart | |
| 4,865,921 | A | | 9/1989 | Hollenberg et al. | |
| 4,871,111 | A | | 10/1989 | Mode | |
| 4,890,439 | A | | 1/1990 | Smart | |
| 4,915,235 | A | | 4/1990 | Roosa | |
| 4,936,935 | A | | 6/1990 | Beckett | |
| 4,963,424 | A | | 10/1990 | Beckett | |
| 5,020,717 | A | * | 6/1991 | Cassidy ................ | B65D 5/667 229/114 |
| 5,039,364 | A | | 8/1991 | Beckett et al. | |
| 5,049,710 | A | | 9/1991 | Prosise et al. | |
| 5,077,455 | A | | 12/1991 | Peleg et al. | |
| 5,117,078 | A | | 5/1992 | Beckett | |
| 5,213,902 | A | | 5/1993 | Beckett | |
| 5,221,419 | A | | 6/1993 | Beckett | |
| 5,260,537 | A | | 11/1993 | Beckett | |
| 5,266,386 | A | | 11/1993 | Beckett | |
| 5,294,765 | A | | 3/1994 | Archibald et al. | |
| RE34,683 | E | | 8/1994 | Maynard et al. | |
| 5,338,921 | A | | 8/1994 | Maheux et al. | |
| 5,340,436 | A | | 8/1994 | Beckett | |
| 5,351,879 | A | | 10/1994 | Liu et al. | |
| 5,354,973 | A | | 10/1994 | Beckett | |
| 5,410,135 | A | | 4/1995 | Pollart et al. | |
| 5,424,517 | A | | 6/1995 | Habeger, Jr. et al. | |
| 5,519,195 | A | | 5/1996 | Keefer et al. | |
| 5,520,322 | A | | 5/1996 | Conviser | |
| 5,628,921 | A | | 5/1997 | Beckett | |
| 5,672,407 | A | | 9/1997 | Beckett | |
| 5,720,429 | A | | 2/1998 | Cordle | |
| 5,726,426 | A | | 3/1998 | Davis et al. | |
| 5,759,422 | A | | 6/1998 | Schmelzer et al. | |
| 5,800,724 | A | | 9/1998 | Habeger et al. | |
| 5,816,485 | A | | 10/1998 | Bernstein | |
| 5,948,308 | A | * | 9/1999 | Wischusen, III .... | B65D 5/2033 219/730 |
| 5,961,035 | A | | 10/1999 | Correll | |
| 6,019,276 | A | | 2/2000 | Auclair | |
| 6,050,482 | A | | 4/2000 | Cai | |
| 6,102,281 | A | | 8/2000 | Lafferty et al. | |
| 6,114,679 | A | | 9/2000 | Lai et al. | |
| 6,137,099 | A | | 10/2000 | Hamblin | |
| 6,150,646 | A | | 11/2000 | Lai et al. | |
| 6,170,740 | B1 | | 1/2001 | Clark | |
| 6,182,890 | B1 | | 2/2001 | Sattler et al. | |
| 6,204,492 | B1 | | 3/2001 | Zeng et al. | |
| 6,251,451 | B1 | | 6/2001 | Zeng | |
| 6,414,290 | B1 | | 7/2002 | Cole et al. | |
| 6,433,322 | B2 | | 8/2002 | Zeng et al. | |
| 6,455,827 | B2 | | 9/2002 | Zeng | |
| 6,513,704 | B1 | | 2/2003 | Perot | |
| 6,552,315 | B2 | | 4/2003 | Zeng et al. | |
| 6,561,414 | B1 | | 5/2003 | Cai | |
| 6,677,563 | B2 | | 1/2004 | Lai | |
| 6,717,121 | B2 | | 4/2004 | Zeng et al. | |
| 6,719,190 | B2 | | 4/2004 | Yocum | |
| 6,765,182 | B2 | | 7/2004 | Cole et al. | |
| 7,007,838 | B1 | | 3/2006 | Bostick, II | |
| 7,019,271 | B2 | | 3/2006 | Wnek et al. | |
| 7,140,532 | B2 | | 11/2006 | Holt et al. | |
| 7,219,828 | B2 | | 5/2007 | Lombardo | |
| 7,273,162 | B2 | | 9/2007 | Baker | |
| 7,323,669 | B2 | | 1/2008 | Robison et al. | |
| 7,351,942 | B2 | | 4/2008 | Wnek et al. | |
| 7,365,292 | B2 | | 4/2008 | Cole et al. | |
| 7,473,875 | B2 | | 1/2009 | Fitzwater | |
| 7,514,659 | B2 | | 4/2009 | Lafferty | |
| 7,541,562 | B2 | | 6/2009 | Cole et al. | |
| 7,648,031 | B2 | | 1/2010 | Kari | |
| 7,667,167 | B2 | | 2/2010 | Fitzwater | |
| 7,748,536 | B2 | | 7/2010 | Cassese et al. | |
| 7,762,394 | B2 | | 7/2010 | Bradford et al. | |
| 7,793,821 | B2 | | 9/2010 | Oliveira | |
| 7,798,327 | B1 | | 9/2010 | Berkani et al. | |
| 7,824,719 | B2 | | 11/2010 | Cole et al. | |
| 7,893,389 | B2 | | 2/2011 | Fitzwater | |
| 7,975,871 | B2 | | 7/2011 | Wnek et al. | |
| 7,982,167 | B2 | | 7/2011 | Fitzwater | |
| 7,982,349 | B2 | | 7/2011 | Popov et al. | |
| 8,013,280 | B2 | | 9/2011 | Robison et al. | |
| 8,061,265 | B2 | | 11/2011 | Cambay | |
| 8,063,344 | B2 | | 11/2011 | Cole et al. | |
| 8,087,570 | B2 | | 1/2012 | Ho Fung | |
| 8,106,339 | B2 | | 1/2012 | Robbins et al. | |
| 8,158,914 | B2 | | 4/2012 | Wnek et al. | |
| 8,183,506 | B2 | | 5/2012 | Fitzwater | |
| 8,252,217 | B2 | | 8/2012 | Wnek et al. | |
| 8,309,896 | B2 | | 11/2012 | Fitzwater | |
| 8,492,690 | B1 | | 7/2013 | Watkins | |
| 9,078,296 | B2 | * | 7/2015 | Fitzwater ........... | B65D 81/3453 |
| 9,499,296 | B2 | | 11/2016 | Mills et al. | |
| 9,764,887 | B2 | | 9/2017 | Lai et al. | |
| 10,232,973 | B2 | | 3/2019 | Burke | |
| 10,336,500 | B2 | | 7/2019 | Burke | |
| 10,414,573 | B2 | * | 9/2019 | Pinkstone ............ | B65D 5/2033 |
| 10,457,466 | B2 | | 10/2019 | Fitzwater | |
| 2002/0084319 | A1 | | 7/2002 | Yocum | |
| 2003/0006273 | A1 | | 1/2003 | Tsern et al. | |
| 2003/0226881 | A1 | | 12/2003 | Liou | |
| 2004/0232034 | A1 | | 11/2004 | Lebras | |
| 2004/0238534 | A1 | | 12/2004 | Mast | |
| 2005/0082355 | A1 | | 4/2005 | Beutler | |
| 2005/0194286 | A1 | | 9/2005 | Ilyayeva et al. | |
| 2005/0205565 | A1 | | 9/2005 | Cole et al. | |
| 2006/0049190 | A1 | | 3/2006 | Middleton et al. | |
| 2006/0096978 | A1 | | 5/2006 | Lafferty et al. | |
| 2006/0113300 | A1 | | 6/2006 | Wnek et al. | |

(56) References Cited

U.S. PATENT DOCUMENTS

| | | | | |
|---|---|---|---|---|
| 2006/0180644 | A1 | 8/2006 | Baker | |
| 2006/0278521 | A1 | 12/2006 | Stowell | |
| 2007/0102424 | A1 | 5/2007 | Keefe | |
| 2007/0131744 | A1 | 6/2007 | Fitzwater | |
| 2007/0131745 | A1 | 6/2007 | Fitzwater | |
| 2007/0215611 | A1 | 9/2007 | O'Hagan et al. | |
| 2007/0251942 | A1 | 11/2007 | Cole et al. | |
| 2007/0251943 | A1 | 11/2007 | Wnek et al. | |
| 2007/0275130 | A1 | 11/2007 | Cole et al. | |
| 2008/0000897 | A1 | 1/2008 | Robbins et al. | |
| 2008/0023469 | A1 | 1/2008 | Fitzwater | |
| 2008/0047958 | A1 | 2/2008 | Cole et al. | |
| 2008/0078759 | A1 | 4/2008 | Wnek et al. | |
| 2008/0081095 | A1 | 4/2008 | Cole et al. | |
| 2008/0110966 | A1 | 5/2008 | Yocum | |
| 2009/0072015 | A1 | 3/2009 | Drew et al. | |
| 2009/0090708 | A1 | 4/2009 | Requena et al. | |
| 2009/0218338 | A1 | 9/2009 | Futzwater | |
| 2010/0025393 | A1 | 2/2010 | Talpaert | |
| 2010/0038359 | A1 * | 2/2010 | Laubhan | H05B 6/80 219/730 |
| 2010/0051675 | A1 | 3/2010 | Sweet | |
| 2010/0065556 | A1 | 3/2010 | Cole | |
| 2010/0065621 | A1 | 3/2010 | Quaintance | |
| 2010/0072197 | A1 | 3/2010 | Neff et al. | |
| 2010/0122999 | A1 | 5/2010 | Brand | |
| 2010/0193509 | A1 | 8/2010 | Fitzwater | |
| 2010/0264135 | A1 | 10/2010 | Cole | |
| 2011/0024413 | A1 | 2/2011 | Cole | |
| 2011/0114715 | A1 | 5/2011 | House | |
| 2011/0132903 | A1 | 6/2011 | Cole | |
| 2011/0233266 | A1 | 9/2011 | Pezzoli | |
| 2012/0100265 | A1 | 4/2012 | Lafferty | |
| 2013/0087607 | A1 | 4/2013 | Learn | |
| 2015/0164252 | A1 | 6/2015 | Sloat et al. | |

FOREIGN PATENT DOCUMENTS

| | | | | | |
|---|---|---|---|---|---|
| EP | 1 481 922 | A2 | | 12/2004 | |
| EP | 1 364 558 | B1 | | 3/2005 | |
| EP | 2240385 | | | 6/2008 | |
| FR | 2 867 346 | | | 9/2005 | |
| GB | 2349381 | | * | 11/2001 | B65D 5/2023 |
| JP | 4-253670 | | | 9/1992 | |
| JP | 06-329149 | A | | 11/1994 | |
| KR | 20-0457299 | Y1 | | 12/2011 | |
| WO | WO 94/05563 | | | 3/1994 | |
| WO | WO 02/060223 | A1 | | 8/2002 | |
| WO | WO 03/066435 | A2 | | 8/2003 | |
| WO | WO 2005/077783 | A1 | | 8/2005 | |
| WO | WO 2006/076501 | A1 | | 7/2006 | |
| WO | WO 2007/127235 | A2 | | 11/2007 | |
| WO | WO 2007/133659 | A2 | | 11/2007 | |
| WO | WO 2007/136839 | A2 | | 11/2007 | |

OTHER PUBLICATIONS

International Search Report and Written Opinion for PCT/US2019/061669 dated Mar. 6, 2020.

* cited by examiner

ADJUSTABLE TRAY

CROSS-REFERENCE TO RELATED APPLICATION

This application claims the benefit of U.S. Provisional Patent Application No. 62/770,012, filed on Nov. 20, 2018.

INCORPORATION BY REFERENCE

The disclosure of U.S. Provisional Patent Application No. 62/770,012, filed on Nov. 20, 2018 is hereby incorporated by reference for all purposes as if presented herein in its entirety.

BACKGROUND OF THE DISCLOSURE

The present disclosure generally relates to containers such as cartons or trays for holding and/or heating food products or other types of articles. In one embodiment, the present disclosure relates to adjustable trays that can be used to prepare food products in a microwave oven.

SUMMARY OF THE DISCLOSURE

According to one aspect of the disclosure, a tray for supporting a food product comprises a plurality of panels extending at least partially around an interior of the tray, the plurality of panels comprising a central panel, at least one side panel, and at least one end panel. The tray further comprises at least one corner flap foldably connected to the at least one end panel, and at least one adjustment feature receiving at least a portion of the at least one corner flap such that the tray is reconfigurable between an erected configuration and a collapsed configuration.

According to another aspect of the disclosure, a blank for forming a tray for supporting a food product comprises a plurality of panels comprising a central panel, at least one side panel, and at least one end panel. The blank further comprises at least one corner flap foldably connected to the at least one end panel, and at least one adjustment feature positioned for receiving at least a portion of the at least one corner flap when the tray is formed from the blank such that the tray is reconfigurable between an erected configuration and a collapsed configuration.

According to another aspect of the disclosure, a method of forming a tray for supporting a food product comprises obtaining a blank comprising a plurality of panels including a central panel, at least one side panel, and at least one end panel, the blank further comprising at least one corner flap foldably connected to the at least one end panel, and at least one adjustment feature. The method further comprises folding the plurality of panels at least partially around an interior of the tray, and positioning the at least one adjustment feature to receive at least a portion of the at least one corner flap such that the tray is reconfigurable between an erected configuration and a collapsed configuration.

BRIEF DESCRIPTION OF THE DRAWINGS

Those skilled in the art will appreciate the above stated advantages and other advantages and benefits of various additional embodiments reading the following detailed description of the embodiments with reference to the below-listed drawing figures.

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION

The containers of the present disclosure can be useful in supporting/containing a food product or other article such as any suitable type of food product that can be heated or cooked in a microwave oven. For example, the food product could include frozen food products or non-frozen food products. Some suitable food products could include such as French fries, chicken nuggets, fish sticks, mozzarella sticks, pizza, French bread pizza, sandwiches, calzones, turnovers, burritos, vegetables, popcorn, or any other suitable food product, any of which can be provided as a frozen or unfrozen food product. Further, the containers of the present disclosure can be used for heating, cooking, browning, crisping, etc. the food product by use of a heating or cooking device such as a microwave oven. It is understood that food products other than the food products listed herein may be contained in the disclosed packages and/or containers. Further, food products disclosed herein can be generally rectangular, triangular, round, square, irregular, or any other shape. In this specification, the terms "lower," "bottom," "upper," and "top" indicate orientations determined in relation to fully erected and upright containers. As described herein, containers can be formed from blanks by overlapping multiple portions, components, and/or elements thereof. Such portions, components, and/or elements may be designated herein in terms relative to one another, e.g., "first", "second", "third", etc., in sequential or non-sequential reference, without departing from the disclosure.

Figure 1:
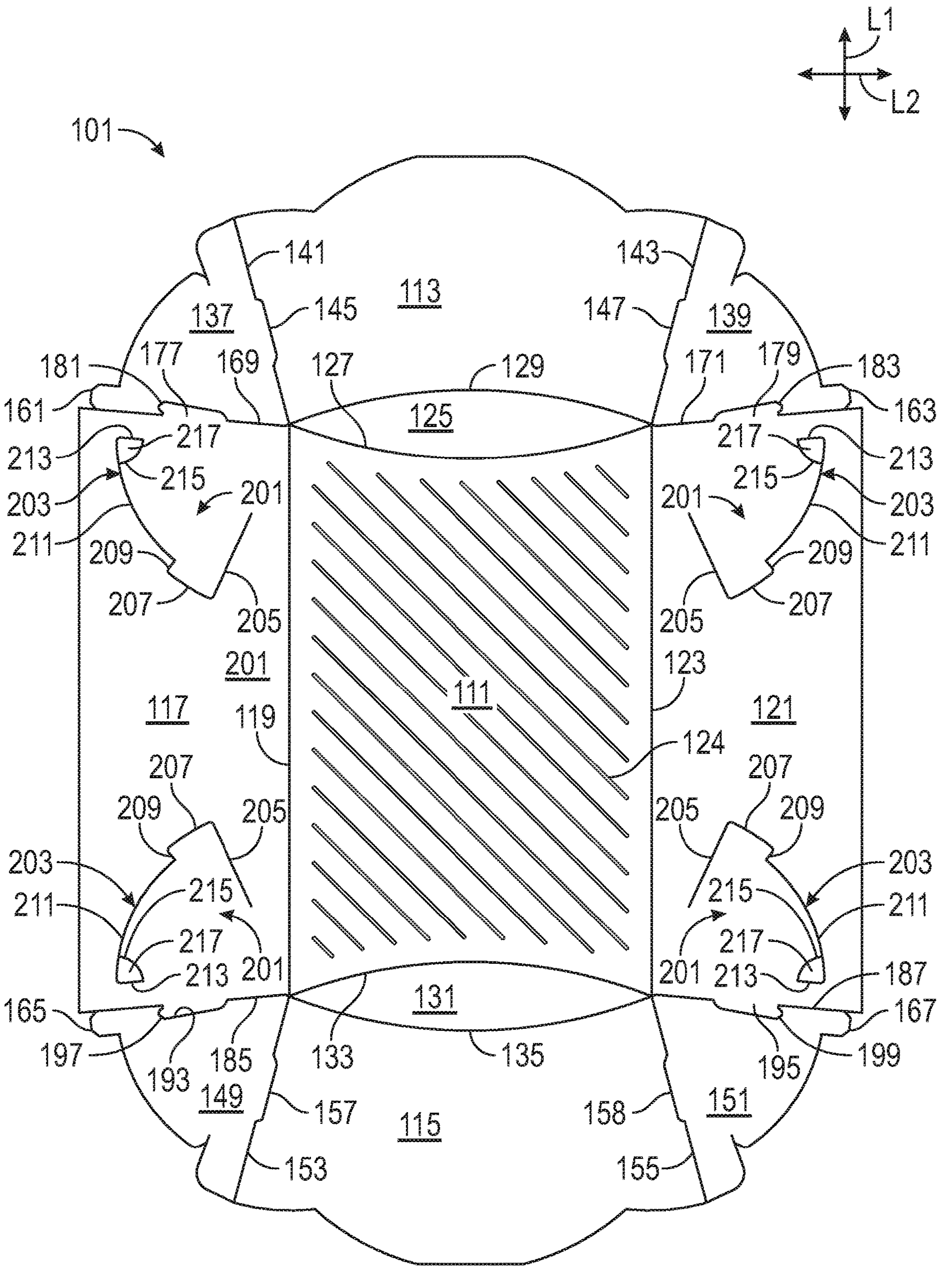
FIG. 1 is a plan view of a blank used to form a tray according to an exemplary embodiment of the present disclosure.

FIG. 1 is a plan view of the exterior surface a blank, generally indicated at 101, used to form a container or tray 103 (FIG. 2) according to an exemplary embodiment of the disclosure. The tray 103 is used to support and hold a food product, for example, French fries, chicken nuggets, fish sticks, mozzarella sticks, pizza, French bread pizza, sandwiches, calzones, turnovers, burritos vegetables, popcorn, or any other suitable food product, any of which can be provided as a frozen or unfrozen food product, during cooking of the food product. In one example, the tray 103 with a food product is placed in a microwave oven (not shown) to heat and/or cook the food product. While the construct formed from the blank 101 is described herein as a tray, it will be understood that a construct having a different configuration can be formed from a blank having the properties of the blank 101, for example, a bowl, a plate, etc.

Figure 2:
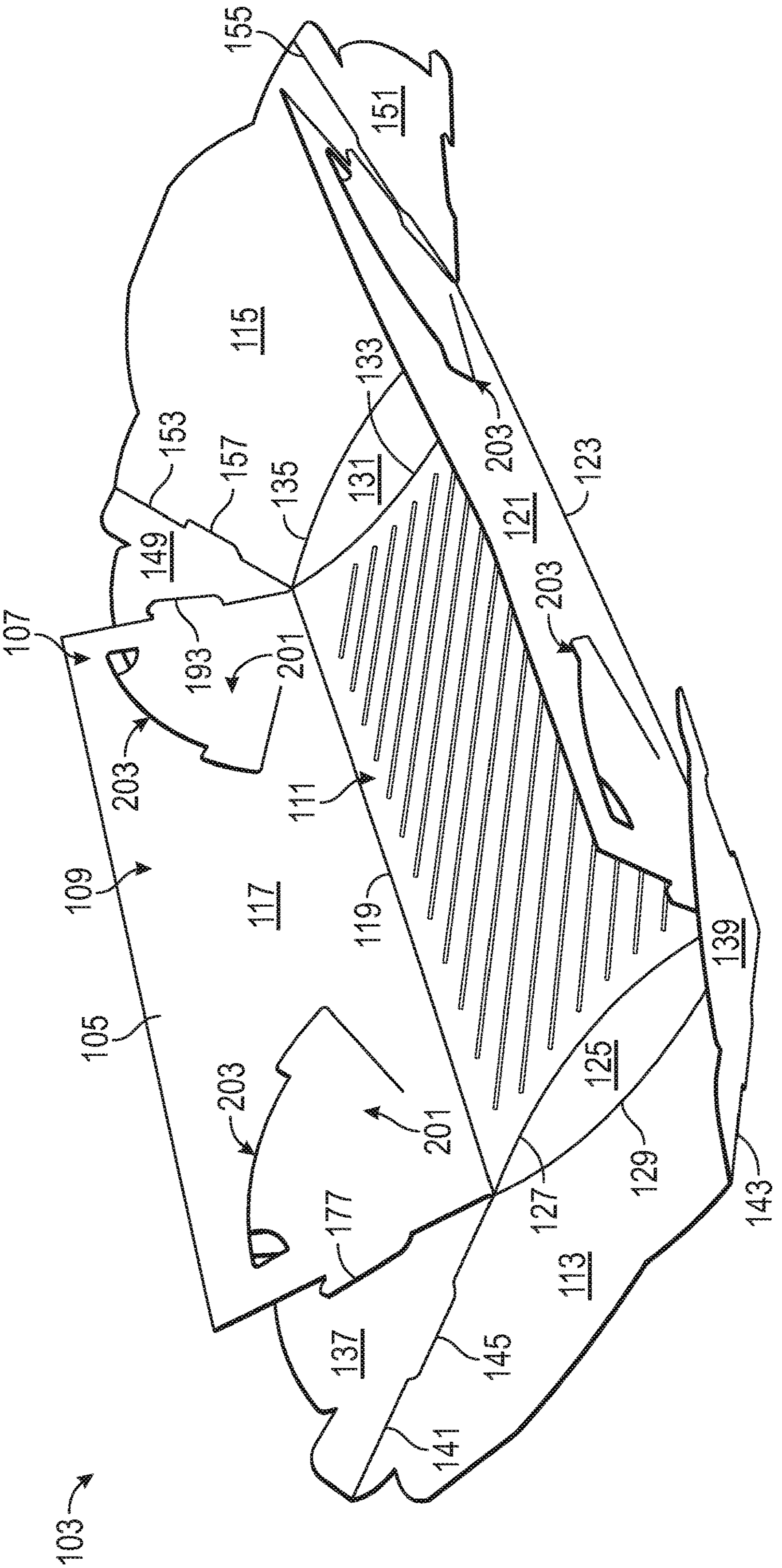
FIG. 2 is a perspective view of a partially folded configuration of a tray formed from the blank of FIG. 1.

At least a portion of the tray 103 can have an element for use in cooking, heating, browning, and/or shielding (e.g., a microwave energy interactive element 105 such as, but not limited to, a metallized film such as a susceptor) mounted to an interior surface 107 thereof (FIG. 2). The microwave energy interactive element 105 can overlie a portion of the interior surface 107 of the blank 101 that includes at least a bottom or central panel 111, a first end panel 113, and a second end panel 115, as described further herein. In this regard, the microwave energy interactive element 105 can define at least a portion of the interior surface 107 of the blank 101/tray 103.

In one embodiment, the microwave energy interactive element 105 can overlie substantially the entire interior surface 107 of the blank 101 such that the microwave energy interactive element 105 can define an interior 109 of the tray 103 formed from the blank 101. The microwave energy interactive element 105 can have a different arrangement on the blank 101 without departing from the disclosure. In another embodiment, the microwave energy interactive element 105 can be omitted from the tray 103.

The blank 101 has a longitudinal axis L1 and a lateral axis L2. The blank 101, as shown includes the central panel 111 foldably connected to a first side panel 117 at a first longitudinal fold line 119. A second side panel 121 is foldably connected to the central panel 111 along a second longitudinal fold line 123. As shown in FIG. 1, the central panel 111 can include a plurality of surface features such as protruding ridges or ribs 124 that can support a food product at an elevated position above the central panel 111, for example, to provide ventilation below the food product to control an amount of heat transferred to the food product from the microwave energy interactive element 105, etc. The ribs 124 can be omitted from the blank 101 or otherwise configured, arranged, and/or positioned without departing from the scope of the disclosure.

As shown, a first base panel 125 is foldably connected to the central panel 111 at a curved fold line 127 and is foldably connected to the first end panel 113 at a curved fold line 129. The curved fold line 127 has a concave configuration relative to the central panel 111, e.g., having a radius of curvature defined from a point spaced away from the central panel 111, and the curved fold line 129 has a convex configuration relative to the central panel 111, e.g., having a radius of curvature defined from a point positioned on or toward the central panel 111. The curved fold lines 127, 129 have intersecting end points such that the curved fold lines 127, 129 define the first base panel 125.

Similarly, a second base panel 131 is foldably connected to the central panel 111 at a curved fold line 133 and is foldably connected to the second end panel 115 at an arcuate fold line 135. The arcuate fold lines 133, 135 have intersecting end points that define the base panel 131, with the arcuate fold line 133 having a concave configuration relative to the central panel 111 and the arcuate fold line 135 having a convex configuration relative to the central panel 111. The base panels 125, 131 can be otherwise shaped, arranged, configured, and/or omitted without departing from the disclosure.

In the illustrated embodiment, a first corner flap 137 and a second corner flap 139 are each foldably connected to the first end panel 113 at respective oblique fold lines 141, 143. Each of the fold lines 141, 143 are interrupted by a respective slot 145, 147, a portion of which is spaced outwardly from the respective fold lines 141, 143. Similarly, a third corner flap 149 and a fourth corner flap 151 are each foldably connected to the second end panel 115 at respective oblique fold lines 153, 155 that are interrupted by respective slots 157, 158. Each corner flap 137, 139, 149, 151 includes a respective projection, such as respective tabs or fingers 161, 163, 165, 167, extending from an outer edge margin thereof.

The corner flaps 137, 139, as shown, are separated from the respective side panels 117, 121 at respective oblique cuts 169, 171. Each oblique cut 169, 171 has a generally linear configuration with the exception of a respective portion that defines a respective tab 177, 179 having a respective projection 181, 183, for example, a hook or barb, extending from the respective side panels 117, 121. Similarly, the corner flaps 149, 151 are separated from the respective side panels 117, 121 at respective oblique cuts 185, 187 that include respective portions that define respective tabs 193, 195 with respective projections 197, 199 extending from the respective side panels 117, 121.

As shown, each side panel 117, 121 includes at longitudinally opposed end portions a respective adjustment feature 201 such that a first adjustment feature 201 and a second adjustment feature 201 are disposed in the first side panel 117 and such that a third adjustment feature 201 and a fourth adjustment feature 201 are disposed in the second side panel 121. Each adjustment feature is defined by a cut 203 that defines a forward stop edge 205, a locking portion 207 extending rearwardly from the forward stop edge 205 and that defines a shoulder 209, a curved adjustment path 211 extending rearwardly from the shoulder 209 to a rear stop edge 213. A curved step or edge 215, as shown, can extend from a portion of the curved adjustment path 211 to a portion of the rear stop edge 213 to define a notch or opening 217 in the respective side panel 117, 121 that is adjacent the rear stop edge 213.

It will be understood that directional references to forward and rearward directions herein refer to movement of the end panels 113, 115 relative to the side panels 117, 121 such that a forward direction of each end panel 113, 115 is toward the interior 109 of the tray 103 and a rearward direction of each end panel 113, 115 is away from the interior 109 of the tray 103. As described further herein, the adjustment features 201 at least partially receive one or more portions of the respective corner flaps 137, 139, 149, 151.

The blank 101 can have a different arrangement of panels, flaps, cuts, and/or fold lines without departing from the disclosure.

Figure 3:
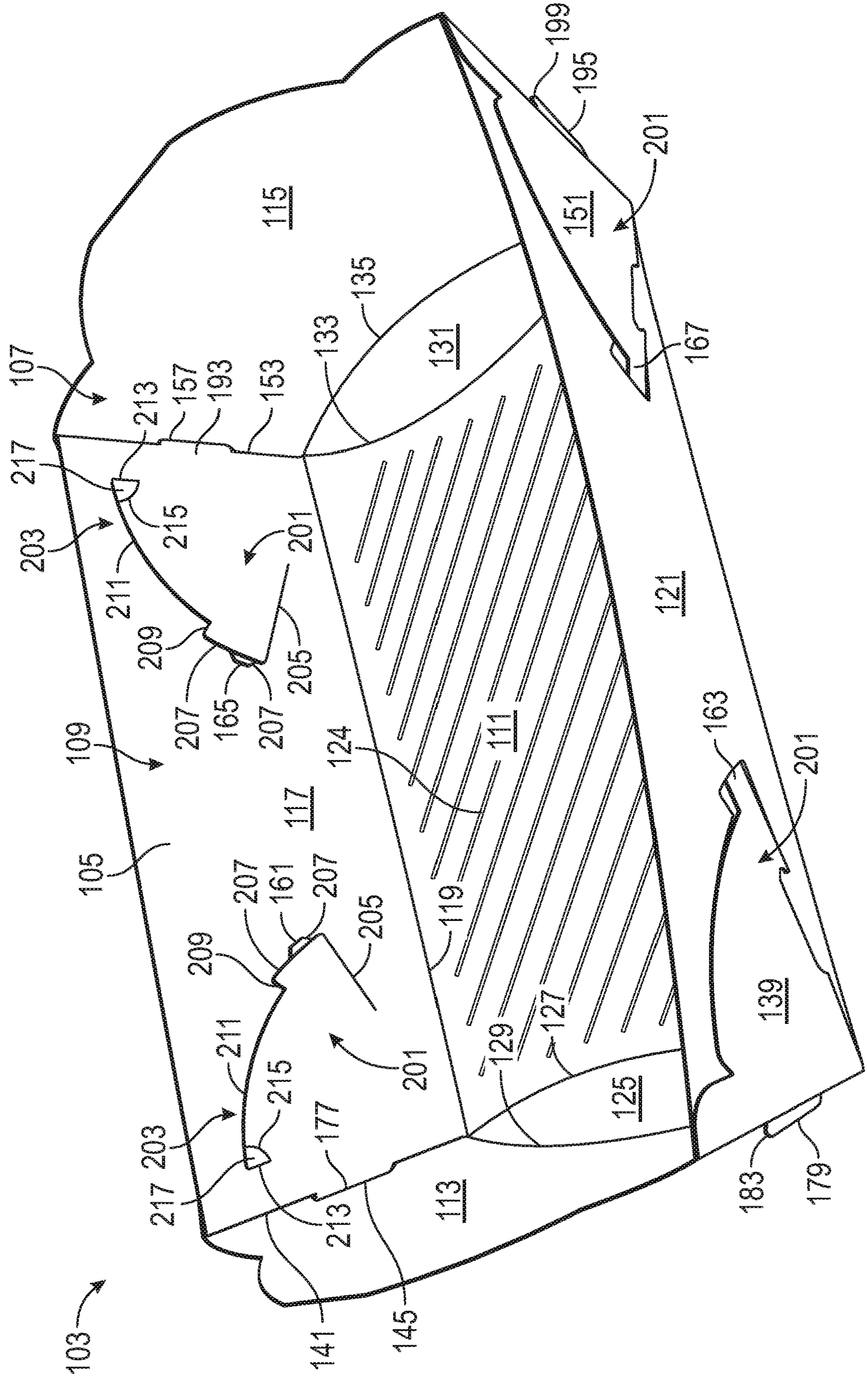
FIG. 3 is a perspective view of a tray formed from the blank of FIG. 1 in a first or erected configuration according to an exemplary embodiment of the disclosure.
Figure 4:
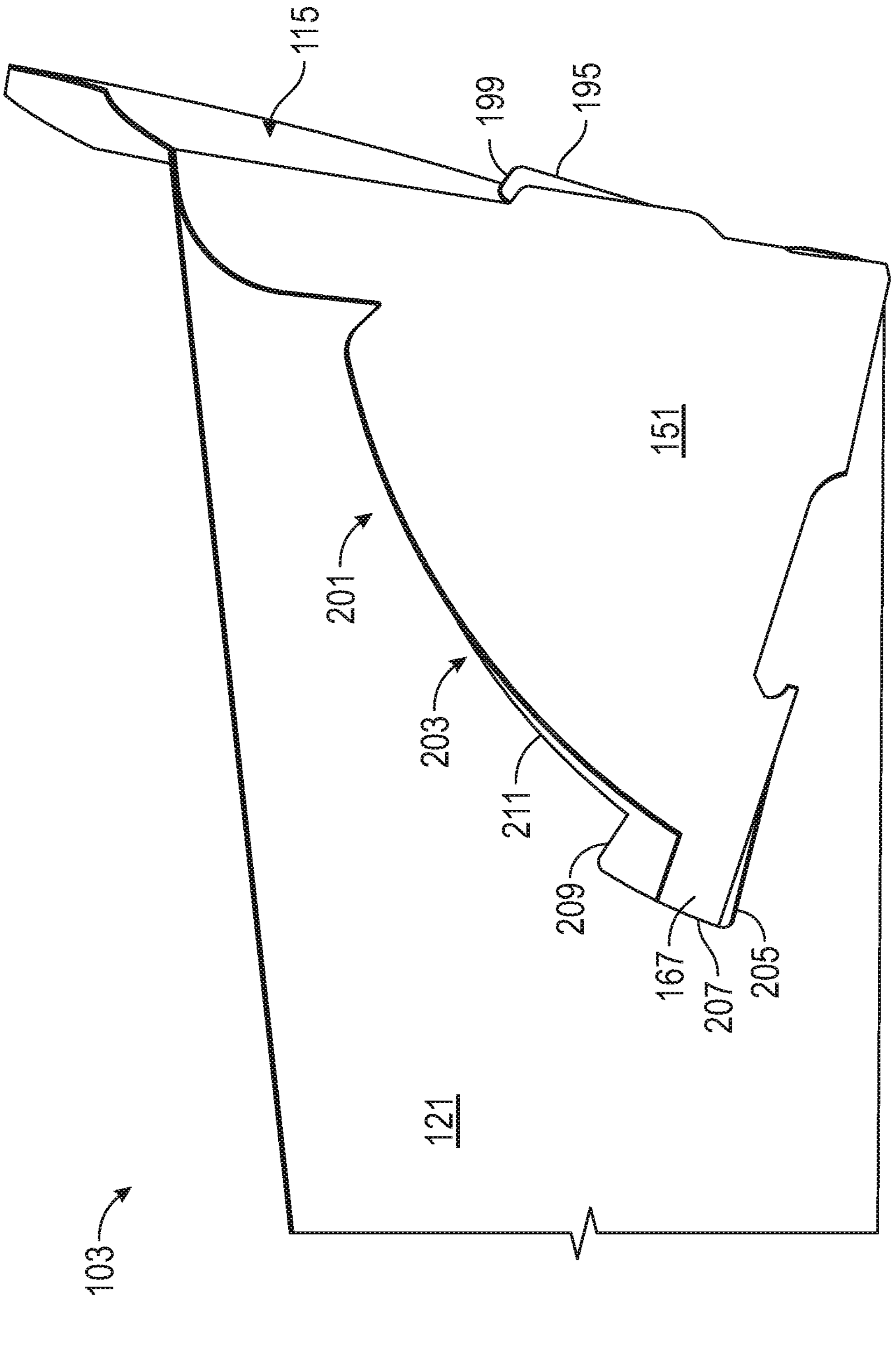
FIG. 4 is a detail view of a portion of the tray of FIG. 3.

Referring additionally to FIGS. 2 and 3, the tray 103 can be erected by folding at least the side panels 117, 121 and the end panels 113, 115 at respective fold lines 119, 123, 129, 135 into generally upright relation relative to the central panel 111 such that the tray 103 defines and extends at least partially around an interior 109 of the tray 103. Such positioning of the end panels 113, 115 can cause the respective base panels 125, 131 to at least partially fold at one or more the respective fold lines 127, 129 and 133, 135 such that one or both of the base panels 125, 131 can be disposed in oblique relation to the respective end panels 113, 115 and/or the central panel 111, for example, to support and/or engage a food product in the interior 109 of the tray 103.

The arrangement of the end panels 113, 115 and the side panels 117, 121 can be at least partially maintained by the insertion of the respective tabs 177, 179 of the respective side panels 117, 121 and the respective tabs 193, 195 of the respective side panels 117, 121 through the respective slots 145, 147 and respective slots 157, 158 such that the respective projections 181, 183 and respective projections 197, 199 engage exterior portions of the respective end panels 113, 115. In one embodiment, at least the end panels 113, 115 and the side panels 117, 121 can be disposed in oblique relation to the central panel 111 such that the tray 103 has a generally tapered configuration from a top to a bottom thereof, for example, to facilitate storage of a food product and/or to facilitate stacking or nesting of multiple trays 103.

During erection of the tray 103 from the blank 101, the corner flaps 137, 139, 149, 151 can be folded at the respective fold lines 141, 143, 153, 155 such that the corner flaps 137, 149 are in at least partial face-to-face contact with the side panel 117 and such that the corner flaps 139, 151 are in at least partial face-to-face contact with the side panel 121.

At least the respective fingers 161, 163, 165, 167 of the respective corner flaps 137, 139, 149, 151 can be inserted through the respective cuts 203 at the respective locking portions 207 such that at least those portion of the respective corner flaps 137, 139, 149, 151 engage the respective adjustment features 201 along the interior surface 107 of the tray 103.

As shown, the respective fingers 161, 163, 165, 167 can be maintained proximate the respective forward stop edges 205, e.g., along the respective locking portions 207 at or between the respective forward stop edges 205 and the respective shoulders 209, to define a first or serving or erected configuration of the tray 103, shown best in FIG. 3. The respective shoulders 209 can engage the respective fingers 161, 163, 165, 167, e.g., in edge-to-edge contact thereof, to inhibit, minimize, and/or prevent rearward translation or sliding of the respective fingers 161, 163, 165, 167 along the respective cuts 203, for example, to avoid inadvertent or undesired incidental adjustment of the tray 103.

Figure 5:
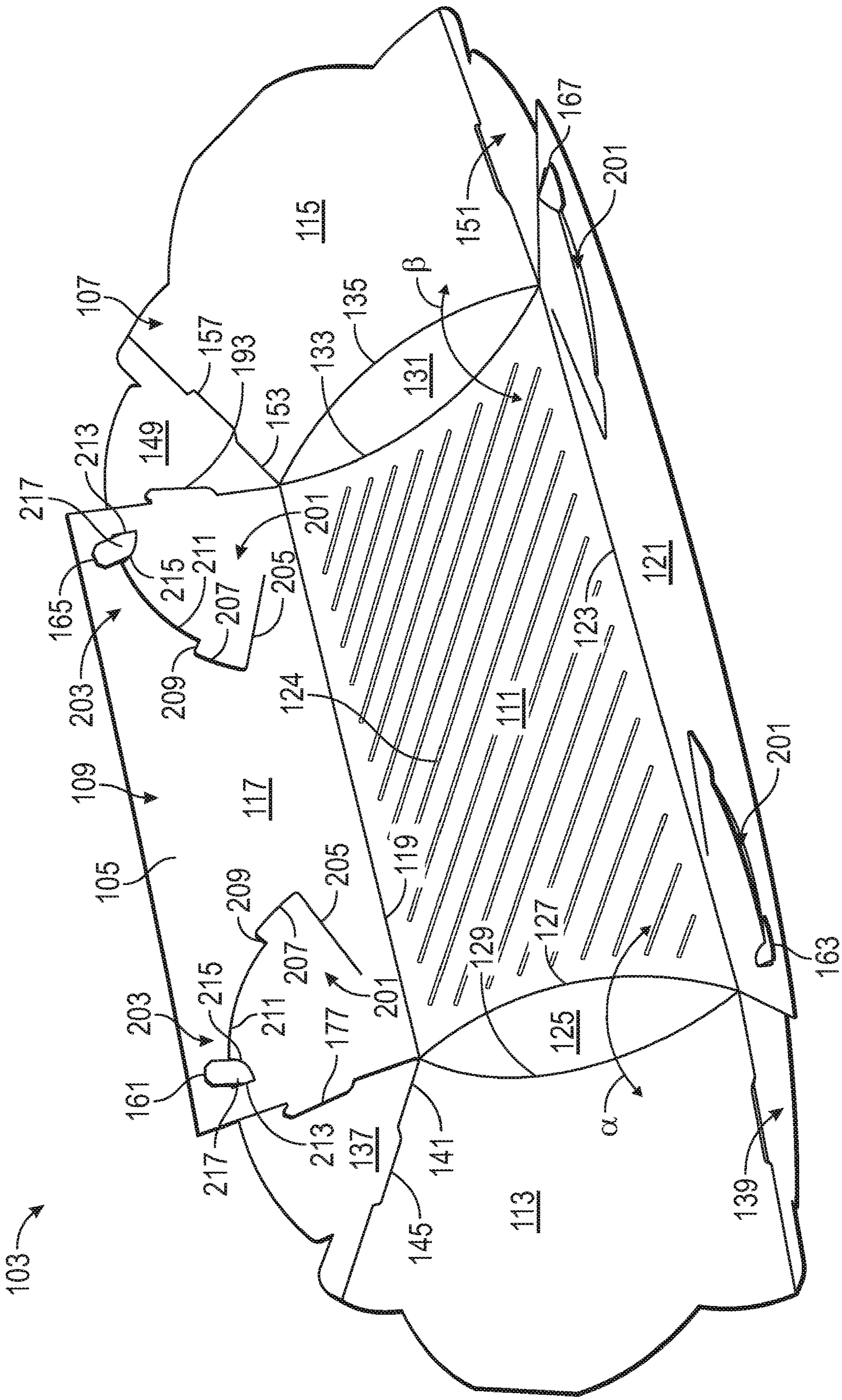
FIG. 5 is a perspective view of the tray of FIG. 3 in a second or collapsed configuration.
Figure 6:
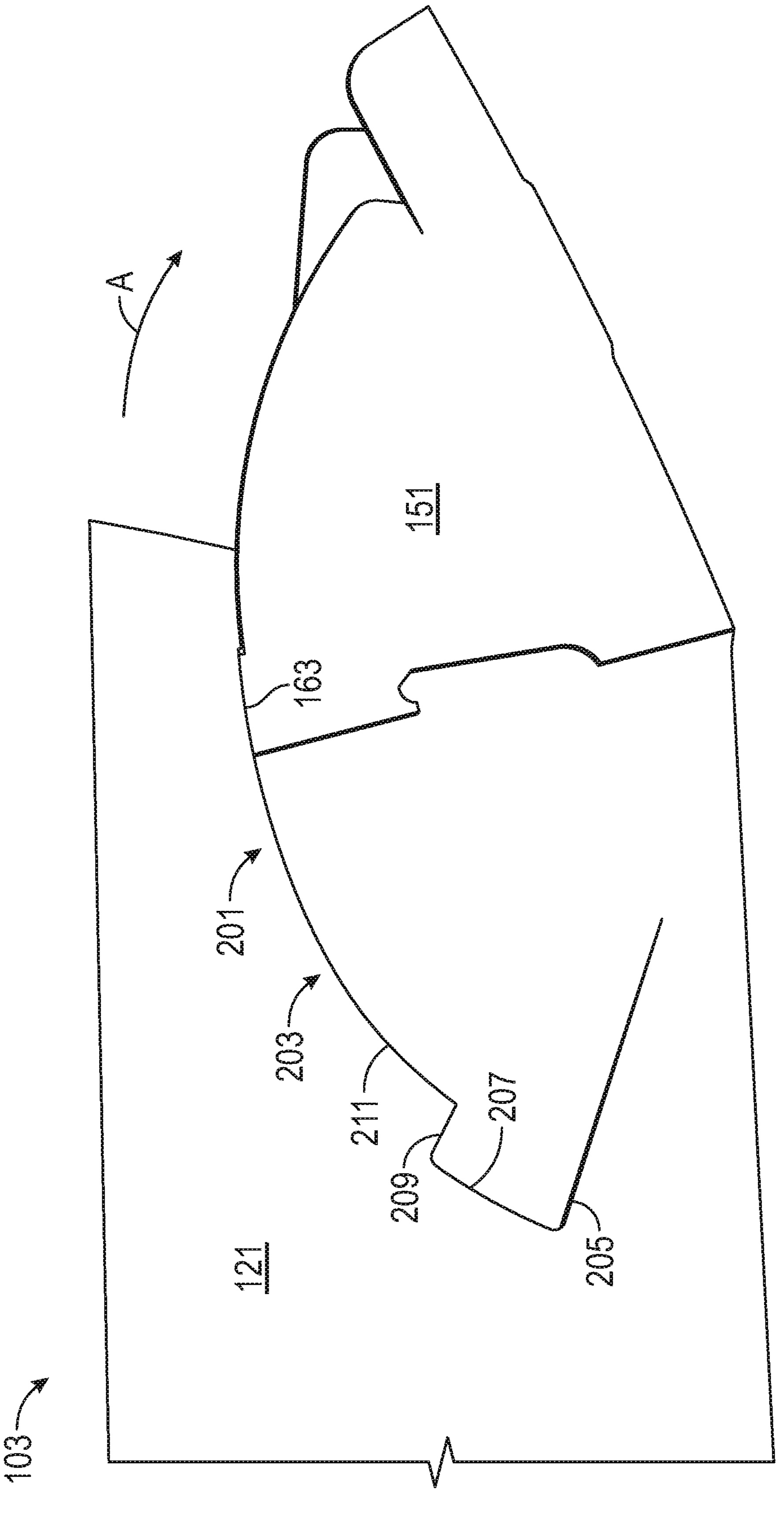
FIG. 6 is a detail view of a portion of the tray of FIG. 5.

Referring to FIGS. 1, 5, and 6, in one embodiment, the tray 103 can be reconfigured from the erected configuration to a second or cooking or collapsed configuration by pulling the end panels 113, 115 away from the interior 109 of the tray 103 such that the respective tabs 177, 179 of the respective side panels 117, 121 and the respective tabs 193, 195 of the respective side panels 117, 121 disengage from the respective slots 145, 147, 157, 158, and such that the end panels 113, 115 at least partially fold downward at the respective fold lines 129, 135 and/or such that the base panels 125, 131 fold away from the interior 109 of the tray 103 at the respective fold lines 127, 133.

Such movement of the end panels 113, 115 and/or the base panels 125, 131 causes the respective fingers 161, 163, 165, 167 of the respective corner flaps 137, 139, 149, 151 to overcome, e.g., cam over and/or otherwise move past, the respective shoulders 209 toward the respective curved adjustment paths 211 and the respective notches 217 and respective rear stop edges 213. In this regard, the respective fingers 161, 163, 165, 167 can translate or slide along the respective adjustment paths 211 of the respective cuts 203 to the respective notches 217 and respective rear stop edges 213 that inhibit, minimize, and/or prevent further translation of the respective fingers 161, 163, 165, 167 along the respective cuts 203, such that the tray 103 is provided in the collapsed configuration. Accordingly, in the collapsed configuration of the tray 103, the respective fingers 161, 163, 165, 167 are positioned proximate the respective rear stop edges 213, e.g., at or between the respective shoulders 209 and respective rear stop edges 213 along the respective cuts 203. Such movement of the corner flap 151 relative to the side panel 121 is illustrated in detail in FIG. 6, in the direction of the arrow A.

In one embodiment, the respective fingers 161, 163, 165, 167 can be positioned at least partially along the respective notches 217 such that the curved step 215 maintains the tray 103 in the collapsed configuration, e.g., by engaging (such as in edge-to-edge contact) the respective fingers 161, 163, 165, 167 and minimizing, inhibiting, and/or preventing forward translation of the respective fingers 161, 163, 165, 167 along the respective cuts 203.

In the collapsed configuration, the end panels 113, 115 can be obliquely-disposed relative to the central panel 111 at respective angles α, β (FIG. 5) that can be between and including about 90 degrees and about 180 degrees. In one embodiment, the end panels 113, 115 can be obliquely-disposed relative to the central panel 111 at an angle of about 95 degrees in the erected configuration and the end panels 113, 115 can be obliquely-disposed relative to the central panel 111 at an angle of about 175 degrees in the collapsed configuration. It will be understood that the angles α, β can have the same value or can be different from one another. In one embodiment, the tray 103 can optionally be arranged in a configuration that is between the erected configuration and the collapsed configuration.

Figure 7:
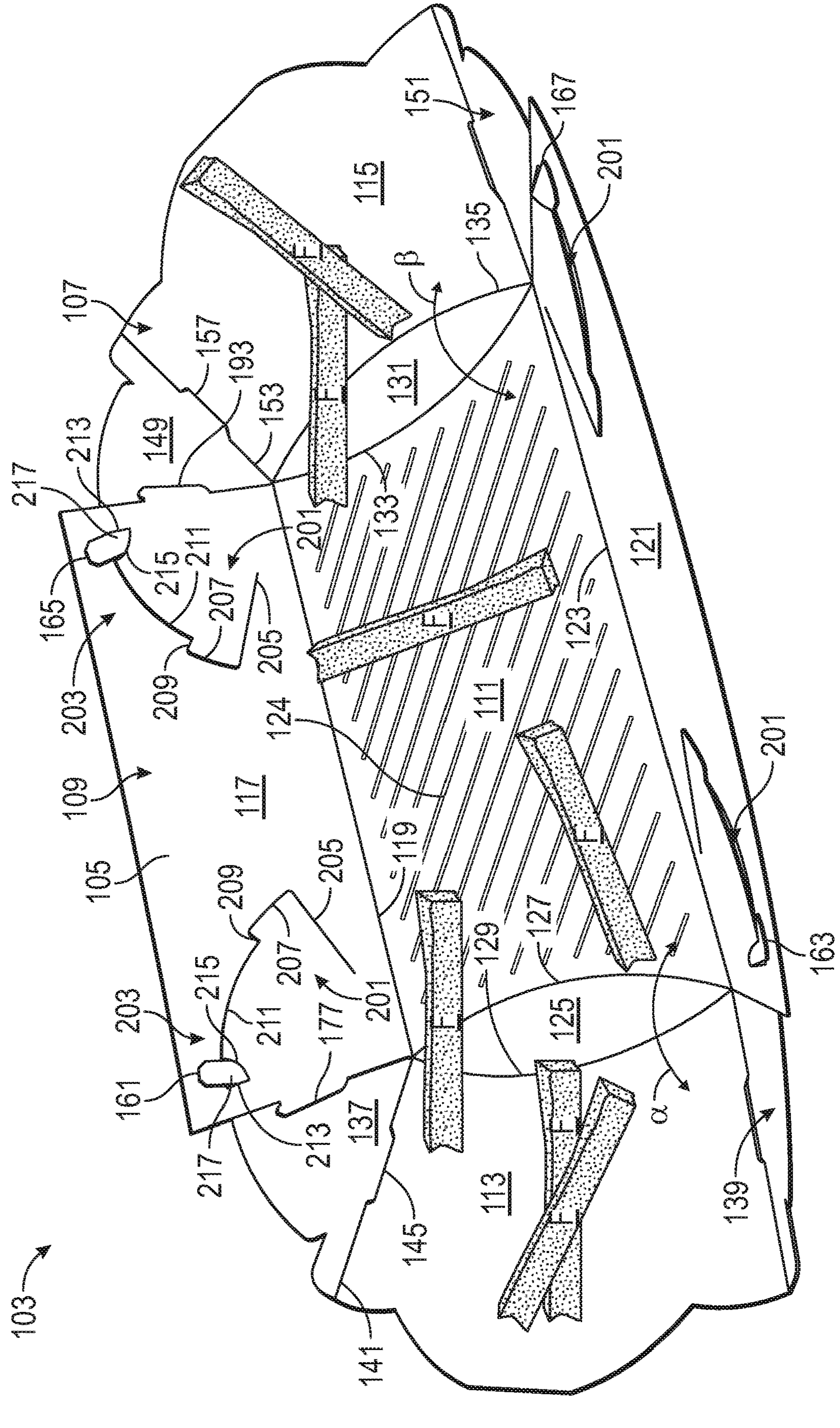
FIG. 7 is a perspective view of the tray of FIG. 5 with a food product disposed therein.

Referring additionally to FIG. 7, in the collapsed configuration, one or more food product F, for example, frozen French fries or chips are shown disposed in the interior 109 of the tray 103 in the collapsed configuration. One or more of the food products F can be a different frozen or non-frozen food product, such as those described herein, without departing from the disclosure.

As shown, one or more of the food products F can be positioned so as to overlie and/or contact the microwave interactive element 105 at one or more of the base panels 125, 131 and the end panels 113, 115 in addition to the central panel 111. In this regard, the collapsed configuration of the tray 103 provides additional surface area on the interior surface 107 of the tray 103 upon which the food product F can contact the microwave energy interactive element 105, for example, such that additional heat can be provided to the food products F to promote faster, more uniform, and/or otherwise desirable heating properties. In one embodiment, one or both of the side panels 117, 121 can be arranged so as to underlie and support one or more food product.

When heating of the food products F and/or other use of the tray 103 in the collapsed configuration is finished, the tray 103 can be re-erected or reconfigured from the collapsed configuration to the erected configuration by reversing the adjustment of the tray 103 described above, e.g., by moving the end panels 113, 115 and/or the base panels 125, 131 at the respective fold lines 129, 135, 127, 133 toward the interior 109 of the tray 103 such that the respective fingers 161, 163, 165, 167 cam over and/or otherwise move past the respective curved steps 215 toward the respective curved adjustment paths 211 and the respective locking portions 207 and respective forward stop edges, at which further movement of the respective fingers 161, 163, 165, 167 is minimized, inhibited, and/or prevented by the respective forward stop edges 205. The respective fingers 161, 163, 165, 167 can be maintained in the respective locking portions 207 via engagement with the respective shoulders 209 as described above.

As described herein, the tray 103 is provided with an adjustable configuration via cooperation of the adjustment features 201 and the respective corner flaps 137, 139, 149, 151 such that the tray 103 can be adjusted from an erected configuration to a collapsed configuration, and can additionally be re-erected or reconfigured from the collapsed configuration to the erected configuration. The collapsed configuration of the tray 103 can provide additional available surface area of the microwave energy interactive material

205 along the base panels 125, 131 and the end panels 113, 115 in an arrangement that can underlie and support one or more food products, for example, for microwave cooking of the food products, and the erected configuration of the tray 103 can provide a convenient container for storage, transportation, and/or retrieval, e.g., for consumption, of one or more food products. Furthermore, the above-described tray 103 is reconfigurable through relative movement of panels in an arrangement such that the mechanical cooperation of the adjustment features 201 and the respective corner flaps 137, 139, 149, 151 can obviate the need for adhesives such as glue to maintain the form of the tray 103.

The microwave interactive element 105 can be attached to the blank 101 by adhesive material (not shown) or by any other suitable mechanism. It is understood that the adhesive attaching the microwave interactive element 105 to the blank 101 may be a patterned layer of adhesive such as evenly spaced spots of adhesive or the adhesive could be otherwise applied without departing from the scope of this disclosure.

The material of the microwave interactive element 105 can be, or include, any type of known microwave interactive material, such as a susceptor that is for absorbing microwaves and/or converting microwaves into thermal energy to thereby become hot and to at least radiantly provide heat to food, a microwave energy shielding element that is for reflecting microwaves away from at least a portion of a food item, a microwave energy directing element for directing microwaves toward at least a portion of a food item, and various combinations of these and other features. In accordance with exemplary embodiments of the present disclosure, the material of the microwave interactive element 105 can more specifically be a microwave insulating material in contact with the food product for heating, browning, and/or crisping the food product during operation of the microwave oven. It is understood that the food product may be a type of food product that may or may not require browning or crisping during microwave heating without departing from the scope of this disclosure.

According to various aspects of the present disclosure, the material of the microwave interactive element 105 of the present disclosure could be any arrangement of layers, such as polymer (e.g., polyester) film layers, susceptor or "microwave interactive" layers, paper layers, continuous and discontinuous adhesive layers, and patterned adhesive layers, that provides an insulating effect. The material of the microwave interactive element 105 may include one or more susceptors, one or more expandable insulating cells, or a combination of susceptors and expandable insulating cells. Examples of materials that may be suitable, alone or in combination, include, but are not limited to, QWIKWAVE® brand susceptor, QWIKWAVE FOCUS® brand susceptor, MICRO-RITE® brand susceptor, MICROFLEX Q® brand susceptor, and QUILTWAVE® brand susceptor, each of which is commercially available from Graphic Packaging International, Inc. The material may be any suitable expandable cell material as desired, and, in some instances, may include any of the materials described herein, any of the materials described in International Publication No. WO 03/066435, published Aug. 14, 2003, which is entirely incorporated by reference herein, or any combination thereof. Alternatively, and as should be apparent from the foregoing, as one example the microwave interactive element 105 can consist essentially solely of a susceptor.

Alternatively or additionally, any of the blanks, packages, or other constructs of the present disclosure may be coated or laminated with other materials to impart other properties, such as absorbency, repellency, opacity, color, printability, stiffness, or cushioning. For example, absorbent susceptors are described in U.S. Patent Application Publication No. 2006/0049190, published Mar. 9, 2006, which is incorporated herein by reference in its entirety. Additionally, the blanks or other constructs may include graphics or indicia printed thereon.

The microwave interactive element 105 can include other materials than described herein and may be otherwise arranged, configured, and/or designed without departing from the scope of the disclosure. Further, multiple layers of microwave interactive element 105 can be used in the tray 103. Alternatively, the microwave interactive element can be omitted without departing from the scope of the disclosure.

In general, any blank as described above may be constructed from paperboard having a caliper so that it is heavier and more rigid than ordinary paper. The blank can also be constructed of other materials, such as cardboard, or any other material having properties suitable for enabling the carton to function at least generally as described above. The blank can be coated with, for example, a clay coating. The clay coating may then be printed over with product, advertising, and other information or images. The blank may then be coated with a varnish to protect information printed on the blanks. The blank may also be coated with, for example, a moisture barrier layer, on either or both sides of the blanks. The blank can also be laminated to or coated with one or more sheet-like materials at selected panels or panel sections.

In accordance with the exemplary embodiments, a fold line can be any substantially linear, although not necessarily straight, form of weakening that facilitates folding therealong. More specifically, but not for the purpose of narrowing the scope of the present disclosure, fold lines include: a score line, such as lines formed with a blunt scoring knife, or the like, which creates a crushed or depressed portion in the material along the desired line of weakness; a cut that extends partially into a material along the desired line of weakness, and/or a series of cuts that extend partially into and/or completely through the material along the desired line of weakness; and various combinations of these features. In situations where cutting is used to create a fold line, typically the cutting will not be overly extensive in a manner that might cause a reasonable user to incorrectly consider the fold line to be a tear line.

The above embodiments may be described as having one or more panels adhered together by glue during erection of the tray embodiments. The term "glue" is intended to encompass all manner of adhesives commonly used to secure tray panels in place.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A tray for supporting a food product, comprising:

a plurality of panels defining an interior of the tray, the plurality of panels comprising a central panel, at least one side panel foldably connected to the central panel, at least one end panel, and at least one base panel foldably connected to each of the central panel and the at least one end panel;

at least one corner flap foldably connected to the at least one end panel; and at least one adjustment feature in the at least one side panel receiving at least a portion of the at least one corner flap such that the tray is reconfigurable between an erected configuration and a collapsed configuration, in the erected configuration the end panel is obliquely disposed relative to the central panel at a first angle, in the collapsed configuration the end panel is obliquely disposed relative to the central panel at a second angle, the second angle is greater than the first angle, wherein the at least one adjustment feature includes a cut and the at least one corner flap includes a finger extending therefrom that is positionable through at least a portion of the cut, the cut defining a forward stop edge and a rear stop edge, and the tray comprises a microwave energy interactive material that at least partially defines the interior of the tray, the microwave energy interactive material is disposed on each of the central panel, the at least one end panel, and the at least one base panel; and wherein the at least one side panel comprises a tab extending therefrom, and the at least one corner flap is foldably connected to the at least one end panel at a fold line that is interrupted by a slot, the tab is at least partially inserted through the slot when the tray is in the erected configuration.

2. The tray of claim 1, wherein, in the erected configuration, the finger is positioned proximate the forward stop edge, and in the collapsed configuration, the finger is positioned proximate the rear stop edge.

3. The tray of claim 2, wherein the forward stop edge is positioned to inhibit movement of the finger along the cut past the forward stop edge, and the rear stop edge is positioned to inhibit movement of the finger along the cut past the rear stop edge.

4. The tray of claim 3, wherein the cut comprises a locking portion extending from the forward stop edge and that defines a shoulder, and the cut comprises a curved adjustment path that extends from the shoulder to the rear stop edge.

5. The tray of claim 4, wherein the shoulder is positioned to inhibit movement of the finger from the locking portion of the cut to the curved adjustment path and the rear stop edge.

6. The tray of claim 5, wherein when the tray is reconfigured from the erected configuration to the collapsed configuration, the finger cams over the shoulder to approach the curved adjustment path and the rear stop edge.

7. The tray of claim 6, wherein a curved step extends from a portion of the curved adjustment path to the rear stop edge to define a notch adjacent the rear stop edge.

8. The tray of claim 1, wherein the tray comprises an interior surface, and the microwave energy interactive material is disposed substantially on an entire interior surface of the tray.

9. The tray of claim 1, wherein, when the tray is in the collapsed configuration, the at least one end panel is arranged relative to the central panel to provide a supporting surface for a food product.

10. The tray of claim 1, wherein the at least one adjustment feature comprises a cut in the at least one side panel that comprises a forward stop edge and a rear stop edge, and the at least one corner flap comprises a finger extending therefrom that is positionable through the cut, in the erected configuration of the tray, the finger is positioned proximate the forward stop edge, and in the collapsed configuration of the tray, the finger is positioned proximate the rear stop edge.

11. The tray of claim 10, wherein the at least one side panel is a first side panel, the at least one end panel is a first end panel, the at least one corner flap is a first corner flap, and the at least one adjustment feature is a first adjustment feature, the plurality of panels further comprises a second side panel and a second end panel, the first corner flap is foldably connected to the first end panel, the tray further comprises a second corner flap foldably connected to the first end panel, a third corner flap foldably connected to the second end panel, and a fourth corner flap foldably connected to the second end panel, the first adjustment feature is disposed in the first side panel, and the tray further comprises a second adjustment feature disposed in the first side panel, a third adjustment feature disposed in the second side panel, and a fourth adjustment feature disposed in the second side panel.

12. A blank for forming a tray for supporting a food product, comprising:

a plurality of panels comprising a central panel, at least one side panel foldably connected to the central panel, at least one end panel, and at least one base panel foldably connected to each of the central panel and the at least one end panel;

at least one corner flap foldably connected to the at least one end panel; and at least one adjustment feature in the at least one side panel positioned for receiving at least a portion of the at least one corner flap when the tray is formed from the blank such that the tray is reconfigurable between an erected configuration and a collapsed configuration, wherein when in the erected configuration of the tray formed from the blank the end panel is obliquely disposed relative to the central panel at a first angle, wherein the at least one adjustment feature comprises a cut, wherein the at least one corner flap comprises a finger extending therefrom that is positionable through at least a portion of the cut when the tray is formed from the blank, the cut defining a forward stop edge and a rear stop edge, wherein when in the collapsed configuration of the tray formed from the blank, the end panel is obliquely disposed relative to the central panel at a second angle, and wherein the second angle is greater than the first angle, a microwave energy interactive material that at least partially defines an interior of the tray formed from the blank, the microwave energy interactive material is disposed on each of the central panel, the at least one end panel, and the at least one base panel; and wherein the at least one side panel comprises a tab extending therefrom, and the at least one corner flap is foldably connected to the at least one end panel at a fold line that is interrupted by a slot.

13. The blank of claim 12, wherein the cut comprises a locking portion extending from the forward stop edge and that defines a shoulder, and the cut comprises a curved adjustment path that extends from the shoulder to the rear stop edge.

14. The blank of claim 13, wherein a curved step extends from a portion of the curved adjustment path to the rear stop edge to define a notch adjacent the rear stop edge.

15. The blank of claim 12, wherein the blank comprises an interior surface, and the microwave energy interactive material is disposed substantially on an entire interior surface of the blank.

16. The blank of claim 12, wherein the at least one adjustment feature comprises a cut in the at least one side panel that comprises a forward stop edge and a rear stop edge, and the at least one corner flap comprises a finger extending therefrom.

17. The blank of claim 16, wherein the at least one side panel is a first side panel, the at least one end panel is a first end panel, the at least one corner flap is a first corner flap, and the at least one adjustment feature is a first adjustment feature, the plurality of panels further comprises a second side panel and a second end panel, the first corner flap is foldably connected to the first end panel, the tray further comprises a second corner flap foldably connected to the first end panel, a third corner flap foldably connected to the second end panel, and a fourth corner flap foldably connected to the second end panel, the first adjustment feature is disposed in the first side panel, and the tray further comprises a second adjustment feature disposed in the first side panel, a third adjustment feature disposed in the second side panel, and a fourth adjustment feature disposed in the second side panel.

18. A method of forming a tray for supporting a food product, comprising:

obtaining a blank comprising a plurality of panels including a central panel, at least one side panel foldably connected to the central panel, at least one end panel, and at least one base panel foldably connected to each of the central panel and the at least one end panel, the blank further comprising at least one corner flap foldably connected to the at least one end panel, and at least one adjustment feature in the at least one side panel;

folding the plurality of panels at least partially around an interior of the tray; and positioning the at least one adjustment feature to receive at least a portion of the at least one corner flap such that the tray is reconfigurable between an erected configuration and a collapsed configuration, in the erected configuration the end panel is obliquely disposed relative to the central panel at a first angle, wherein the at least one adjustment feature comprises a cut, wherein the at least one corner flap comprises a finger extending therefrom that is positionable through at least a portion of the cut, the cut defines a forward stop edge and a rear stop edge, wherein when in the collapsed configuration the end panel is obliquely disposed relative to the central panel at a second angle, and wherein the second angle is greater than the first angle, the tray comprises a microwave energy interactive material that at least partially defines the interior of the tray, the microwave energy interactive material is disposed on each of the central panel, the at least one end panel, and the at least one base panel; and wherein the at least one side panel comprises a tab extending therefrom, and the at least one corner flap is foldably connected to the at least one end panel at a fold line that is interrupted by a slot, the tab is at least partially inserted through the slot when the tray is in the erected configuration.

19. The method of claim 12, wherein, in the erected configuration, the finger is positioned proximate the forward stop edge, and in the collapsed configuration, the finger is positioned proximate the rear stop edge.

20. The method of claim 19, wherein the forward stop edge is positioned to inhibit movement of the finger along the cut past the forward stop edge, and the rear stop edge is positioned to inhibit movement of the finger along the cut past the rear stop edge.

21. The method of claim 20, wherein the cut comprises a locking portion extending from the forward stop edge and that defines a shoulder, and the cut comprises a curved adjustment path that extends from the shoulder to the rear stop edge.

22. The method of claim 21, wherein the shoulder is positioned to inhibit movement of the finger from the locking portion of the cut to the curved adjustment path and the rear stop edge.

23. The method of claim 22, wherein when the tray is reconfigured from the erected configuration to the collapsed configuration, the finger cams over the shoulder to approach the curved adjustment path and the rear stop edge.

24. The method of claim 23, wherein a curved step extends from a portion of the curved adjustment path to the rear stop edge to define a notch adjacent the rear stop edge.

25. The method of claim 18, wherein the tray comprises an interior surface, and the microwave energy interactive material is disposed substantially on an entire interior surface of the tray.

26. The method of claim 18, wherein, when the tray is in the collapsed configuration, the at least one end panel is arranged relative to the central panel to provide a supporting surface for a food product.

27. The method of claim 18, wherein the at least one adjustment feature comprises a cut in the at least one side panel that comprises a forward stop edge and a rear stop edge, and the at least one corner flap comprises a finger extending therefrom that is positionable through the cut, in the erected configuration of the tray, the finger is positioned proximate the forward stop edge, and in the collapsed configuration of the tray, the finger is positioned proximate the rear stop edge.

28. The method of claim 27, wherein the at least one side panel is a first side panel, the at least one end panel is a first end panel, the at least one corner flap is a first corner flap, and the at least one adjustment feature is a first adjustment feature, the plurality of panels further comprises a second side panel and a second end panel, the first corner flap is foldably connected to the first end panel, the tray further comprises a second corner flap foldably connected to the first end panel, a third corner flap foldably connected to the second end panel, and a fourth corner flap foldably connected to the second end panel, the first adjustment feature is disposed in the first side panel, and the tray further comprises a second adjustment feature disposed in the first side panel, a third adjustment feature disposed in the second side panel, and a fourth adjustment feature disposed in the second side panel.

29. The method of claim 18, further comprising reconfiguring the tray from the erected configuration to the collapsed configuration.

30. A tray for supporting a food product, comprising:

a plurality of panels extending at least partially around an interior of the tray, the plurality of panels comprising a central panel, at least one side panel foldably connected to the central panel, at least one end panel, and at least one base panel foldably connected to each of the central panel and the at least one end panel;

at least one corner flap foldably connected to the at least one end panel; and at least one adjustment feature in the at least one side panel receiving at least a portion of the at least one corner flap such that the tray is reconfigurable between an erected configuration and a collapsed configuration, the at least one adjustment feature comprises a cut and the at least one corner flap comprises a finger extending therefrom that is positionable through at least a portion of the cut, the cut defines a forward stop edge and a rear stop edge, and in the erected configuration, the finger is positioned proximate the forward stop edge, and in the collapsed configuration, the finger is positioned proximate the rear stop edge, the at least one side panel comprises a tab extending therefrom, and the at least one corner flap is foldably connected to the at least one end panel at a fold line that is interrupted by a slot, the tab is at least partially inserted through the slot when the tray is in the erected configuration.

31. A blank for forming a tray for supporting a food product, comprising:

a plurality of panels comprising a central panel, at least one side panel foldably connected to the central panel, at least one end panel, and at least one base panel foldably connected to each of the central panel and the at least one end panel;

at least one corner flap foldably connected to the at least one end panel; and at least one adjustment feature in the at least one side panel positioned for receiving at least a portion of the at least one corner flap when the tray is formed from the blank such that the tray is reconfigurable between an erected configuration and a collapsed configuration, the at least one adjustment feature comprises a cut, the at least one corner flap comprises a finger extending therefrom that is positionable through at least a portion of the cut when the tray is formed from the blank, the cut defines a forward stop edge and a rear stop edge, the at least one side panel comprises a tab extending therefrom, and the at least one corner flap is foldably connected to the at least one end panel at a fold line that is interrupted by a slot.

32. A method of forming a tray for supporting a food product, comprising:

obtaining a blank comprising a plurality of panels including a central panel, at least one side panel foldably connected to the central panel, at least one end panel, and at least one base panel foldably connected to each of the central panel and the at least one end panel, the blank further comprising at least one corner flap foldably connected to the at least one end panel, and at least one adjustment feature in the at least one side panel;

folding the plurality of panels at least partially around an interior of the tray; and positioning the at least one adjustment feature to receive at least a portion of the at least one corner flap such that the tray is reconfigurable between an erected configuration and a collapsed configuration, the at least one adjustment feature comprises a cut, the at least one corner flap comprises a finger extending therefrom that is positionable through at least a portion of the cut, the cut defines a forward stop edge and a rear stop edge, and in the erected configuration, the finger is positioned proximate the forward stop edge, and in the collapsed configuration, the finger is positioned proximate the rear stop edge, the at least one side panel comprises a tab extending therefrom, and the at least one corner flap is foldably connected to the at least one end panel at a fold line that is interrupted by a slot, the tab is at least partially inserted through the slot when the tray is in the erected configuration.

* * * * *